US008583992B2

(12) United States Patent
Cho

(10) Patent No.: US 8,583,992 B2
(45) Date of Patent: Nov. 12, 2013

(54) SAS-BASED SEMICONDUCTOR STORAGE DEVICE MEMORY DISK UNIT

(75) Inventor: Byungcheol Cho, Seochogu (KR)

(73) Assignee: Taejin Info Tech Co., Ltd., Seoul (KR)

( * ) Notice: Subject to any disclaimer, the term of this patent is extended or adjusted under 35 U.S.C. 154(b) by 335 days.

(21) Appl. No.: 13/010,230

(22) Filed: Jan. 20, 2011

(65) Prior Publication Data

US 2012/0192038 A1    Jul. 26, 2012

(51) Int. Cl.
*G11C 29/00*    (2006.01)

(52) U.S. Cl.
USPC ......................................................... 714/770

(58) Field of Classification Search
USPC .................. 714/763–764, 769–770
See application file for complete search history.

(56) References Cited

U.S. PATENT DOCUMENTS

| | | | | |
|---|---|---|---|---|
| 5,077,737 A | * | 12/1991 | Leger et al. ..................... | 714/6.1 |
| 5,414,689 A | * | 5/1995 | Maeda et al. ............... | 369/59.11 |
| 5,838,891 A | * | 11/1998 | Mizuno et al. ................ | 714/5.11 |
| 6,697,991 B1 | * | 2/2004 | Takiue .......................... | 714/763 |
| 7,426,624 B2 | * | 9/2008 | Fukuguchi et al. ........... | 711/173 |

OTHER PUBLICATIONS

"Serial-attached SCSI", Definition from SearchStorage.com Definitions, Jan. 27, 2011, 2 pages. http://searchstorge.techtarget.com/sDefinition/0,,sid5_gci1026971,00.html.
"Fibre Channel", Definition from SearchStorge.com Definitions, Jan. 27, 2011, 2pages. http://searchstorge.techtarget.com/sDefinition/0,,sid5_gci212114,00.html.

* cited by examiner

*Primary Examiner* — Shelly A Chase
(74) *Attorney, Agent, or Firm* — Saliwanchik Lloyd & Eisenschenk

(57) ABSTRACT

Embodiments of the present invention provide a storage device of a serial-attached small computer system interface/serial advanced technology attachment (PCI-Express) type that supports a low-speed data processing speed for a host. Specifically, the present invention provides a SSD memory system comprising (among other components) a set (at least one) of SSD memory disk units. Each SSD memory disk unit generally comprises (among other components), a host interface unit; a serial-attached small computer system interface (SAS) protocol controller for controlling a SAS protocol of the SSD memory disk unit coupled to the host interface unit; a direct memory access (DMA) controller for controlling access to the SSD memory disk unit coupled to the host interface unit; and a data buffer for buffering data stored in the SSD memory disk unit coupled to the DMA controller.

17 Claims, 4 Drawing Sheets

SAS-BASED SEMICONDUCTOR STORAGE DEVICE MEMORY DISK UNIT

FIELD OF THE INVENTION

The present invention relates to a semiconductor storage device (SSD) of a serial-attached small computer system interface/serial advanced technology. Specifically, the present invention relates to an SSD memory disk unit having a serial-attached small computer system interface (SAS) protocol controller and a data buffer for providing SAS functionality.

BACKGROUND OF THE INVENTION

As the need for more computer storage grows, more efficient solutions are being sought. As is known, there are various hard disk solutions that store/read data in a mechanical manner as a data storage medium. Unfortunately, data processing speed associated with hard disks is often slow. Moreover, existing solutions still use interfaces that cannot catch up with the data processing speed of memory disks having high-speed data input/output performance as an interface between the data storage medium and the host. Therefore, there is a problem in the existing area in that the performance of the memory disk cannot be property utilized.

SUMMARY OF THE INVENTION

Embodiments of the present invention provide a storage device of a serial-attached small computer system interface/serial advanced technology attachment (PCI-Express) type that supports a low-speed data processing speed for a host. Specifically, the present invention provides a SSD memory system comprising (among other components) a set (at least one) of SSD memory disk units. Each SSD memory disk unit generally comprises (among other components), a host interface unit; a serial-attached small computer system interface (SAS) protocol controller for controlling a SAS protocol of the SSD memory disk unit coupled to the host interface unit; a direct memory access (DMA) controller for controlling access to the SSD memory disk unit coupled to the host interface unit; and a data buffer for buffering data stored in the SSD memory disk unit coupled to the DMA controller.

A first aspect of the present invention provides a semiconductor storage device (SSD) memory disk unit, comprising: a host interface unit; a serial-attached small computer system interface (SAS) protocol controller for controlling a SAS protocol of the SSD memory disk unit coupled to the host interface unit; a direct memory access (DMA) controller for controlling access to the SSD memory disk unit coupled to the host interface unit; and a data buffer for buffering data stored in the SSD memory disk unit coupled to the DMA controller.

A second aspect of the present invention provides a semiconductor storage device (SSD) memory system, comprising: a set of SSD memory disk units, each of the set of SSD memory disk units comprising: a host interface unit; a serial-attached small computer system interface (SAS) protocol controller coupled to the host interface unit for controlling a SAS protocol of the SSD memory disk unit; a direct memory access (DMA) controller coupled to the host interface unit for controlling access to the SSD memory disk unit; a data buffer for buffering data stored in the SSD memory disk unit coupled to the DMA controller; a redundant array of independent disks (RAID) controller coupled to the set of SSD memory disk units; and a controller unit coupled to the RAID controller.

A third aspect of the present invention provides a method for producing a semiconductor storage device (SSD) memory disk unit, comprising: providing a host interface unit; coupling a SAS protocol controller to the host interface unit, the serial-attached small computer system interface (SAS) protocol controller being configured to control a SAS protocol of the SSD memory disk unit; coupling a direct memory access (DMA) to the host interface unit, the DMA controller being configured to control access to the SSD memory disk unit; and coupling a data buffer to the DMA controller, the data buffer being configured to buffer data stored in the SSD memory disk unit.

BRIEF DESCRIPTION OF THE DRAWINGS

These and other features of this invention will be more readily understood from the following detailed description of the various aspects of the invention taken in conjunction with the accompanying drawings in which.

Figure 1:
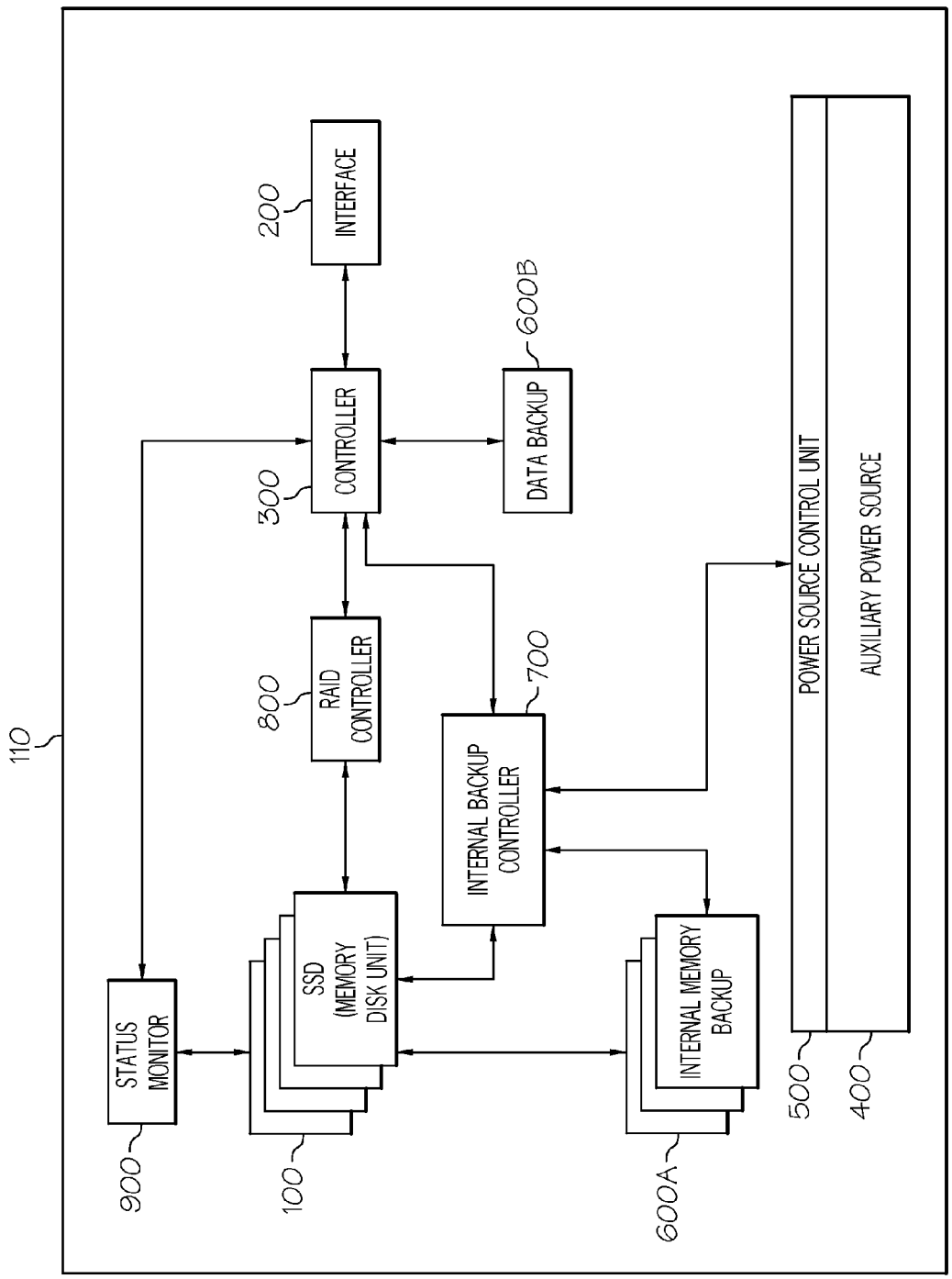
FIG. 1 is a diagram schematically illustrating a configuration of a storage device of a serial-attached small computer system interface/serial advanced technology attachment (PCI-Express) type according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments will now be described more fully herein with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc. do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Moreover, as used herein, the term RAID means redundant array of independent disks (originally redundant array of inexpensive disks). In general, RAID technology is a way of storing the same data in different places (thus, redundantly) on multiple hard disks. By placing data on multiple disks, I/O (input/output) operations can overlap in a balanced way, improving performance. Since multiple disks increase the mean time between failures (MTBF), storing data redundantly also increases fault tolerance. The term SSD means semiconductor storage device. The term DDR means double data rate. Still yet, the term HDD means hard disk drive.

Unless otherwise defined, all terms (including technical and scientific terms) used herein have the same meaning as commonly understood by one of ordinary skill in the art. It will be further understood that terms such as those defined in commonly used dictionaries should be interpreted as having a meaning that is consistent with their meaning in the context of the relevant art and the present disclosure, and will not be interpreted in an idealized or overly formal sense unless expressly so defined herein.

Hereinafter, a RAID storage device of a serial-attached small computer system interface/serial advanced technology attachment (PCI-Express) type according to an embodiment of the present invention will be described in detail with reference to the accompanying drawings.

As indicated above, embodiments of the present invention provide a storage device of a serial-attached small computer system interface/serial advanced technology attachment (PCI-Express) type that supports a low-speed data processing speed for a host. Specifically, the present invention provides a SSD memory system comprising (among other components) a set (at least one) of SSD memory disk units. Each SSD memory disk unit generally comprises (among other components), a host interface unit; a serial-attached small computer system interface (SAS) protocol controller for controlling a SAS protocol of the SSD memory disk unit coupled to the host interface unit; a direct memory access (DMA) controller for controlling access to the SSD memory disk unit coupled to the host interface unit; and a data buffer for buffering data stored in the SSD memory disk unit coupled to the DMA controller.

The storage device of a serial-attached small computer system interface/serial advanced technology attachment (PCI-Express) type supports a low-speed data processing speed for a host by adjusting synchronization of a data signal transmitted/received between the host and a memory disk during data communications between the host and the memory disk through a PCI-Express interface, and simultaneously supports a high-speed data processing speed for the memory disk, thereby supporting the performance of the memory to enable high-speed data processing in an existing interface environment at the maximum. It is understood in advance that although PCI-Express technology will be utilized in a typical embodiment, other alternatives are possible. For example, the present invention could utilize SAS/SATA technology in which a SAS/SATA type storage device is provided that utilizes a SAS/SATA interface.

Referring now to FIG. 1, a diagram schematically illustrating a configuration of a PCI-Express type, RAID controlled semiconductor storage device (e.g., for providing storage for a serially attached computer device) according to an embodiment of the invention is shown. As depicted, FIG. 1 shows a RAID controlled PCI-Express type storage device 110 according to an embodiment of the invention which includes a memory disk unit 100 comprising: a plurality of memory disks having a plurality of volatile semiconductor memories (also referred to herein as high-speed SSDs 100); a RAID controller 800 coupled to SSDs 100; an interface unit 200 (e.g., PCI-Express host) which interfaces between the memory disk unit and a host; a controller unit 300; an auxiliary power source unit 400 that is charged to maintain a predetermined power using the power transferred from the host through the PCI-Express host interface unit; a power source control unit 500 that supplies the power transferred from the host through the PCI-Express host interface unit to the controller unit, the memory disk unit, the backup storage unit, and the backup control unit which, when the power transferred from the host through the PCI-Express host interface unit is blocked or an error occurs in the power transferred from the host, receives power from the auxiliary power source unit and supplies the power to the memory disk unit through the controller unit; a backup storage unit 600A-B that stores data of the memory disk unit; and a backup control unit 700 that backs up data stored in the memory disk unit in the backup storage unit, according to an instruction from the host or when an error occurs in the power transmitted from the host; and a redundant array of independent disks (RAID) controller 800 coupled to memory disk unit 100, controller 300, and internal backup controller 700.

The memory disk unit 100 includes a plurality of memory disks provided with a plurality of volatile semiconductor memories for high-speed data input/output (for example, DDR, DDR2, DDR3, SDRAM, and the like), and inputs and outputs data according to the control of the controller 300. The memory disk unit 100 may have a configuration in which the memory disks are arrayed in parallel.

The PCI-Express host interface unit 200 interfaces between a host and the memory disk unit 100. The host may be a computer system or the like, which is provided with a PCI-Express interface and a power source supply device.

The controller unit 300 adjusts synchronization of data signals transmitted/received between the PCI-Express host interface unit 200 and the memory disk unit 100 to control a data transmission/reception speed between the PCI-Express host interface unit 200 and the memory disk unit 100.

As depicted, a PCI-e type RAID controller 800 can be directly coupled to any quantity of SSDs 100. Among other things, this allows for optimum control of SSDs 100. Among other things, the use of a RAID controller 800:

1. Supports the current backup/restore operations.
2. Provides additional and improved backup function by performing the following:
    a) the internal backup controller 700 determines the backup (user's request order or the status monitor detects power supply problems);
    b) the internal backup controller 700 requests a data backup to SSDs;
    c) the internal backup controller 700 requests internal backup device to backup data immediately;
    d) the internal backup controller 700 monitors the status of the backup for the SSDs and internal backup controller; and
    e) the internal backup controller 700 reports the internal backup controller's status and end-op.
3. Provides additional and improved restore function by performing the following:
    a) the internal backup controller 700 determines the restore (user's request order or the status monitor detects power supply problems);
    b) the internal backup controller 700 requests a data restore to the SSDs;
    c) the internal backup controller 700 requests an internal backup device to restore data immediately;

d) the internal backup controller 700 monitors the status of the restore for the SSDs and internal backup controller; and e) the internal backup controller 700 reports the internal backup controller status and end-op.

Figure 2:
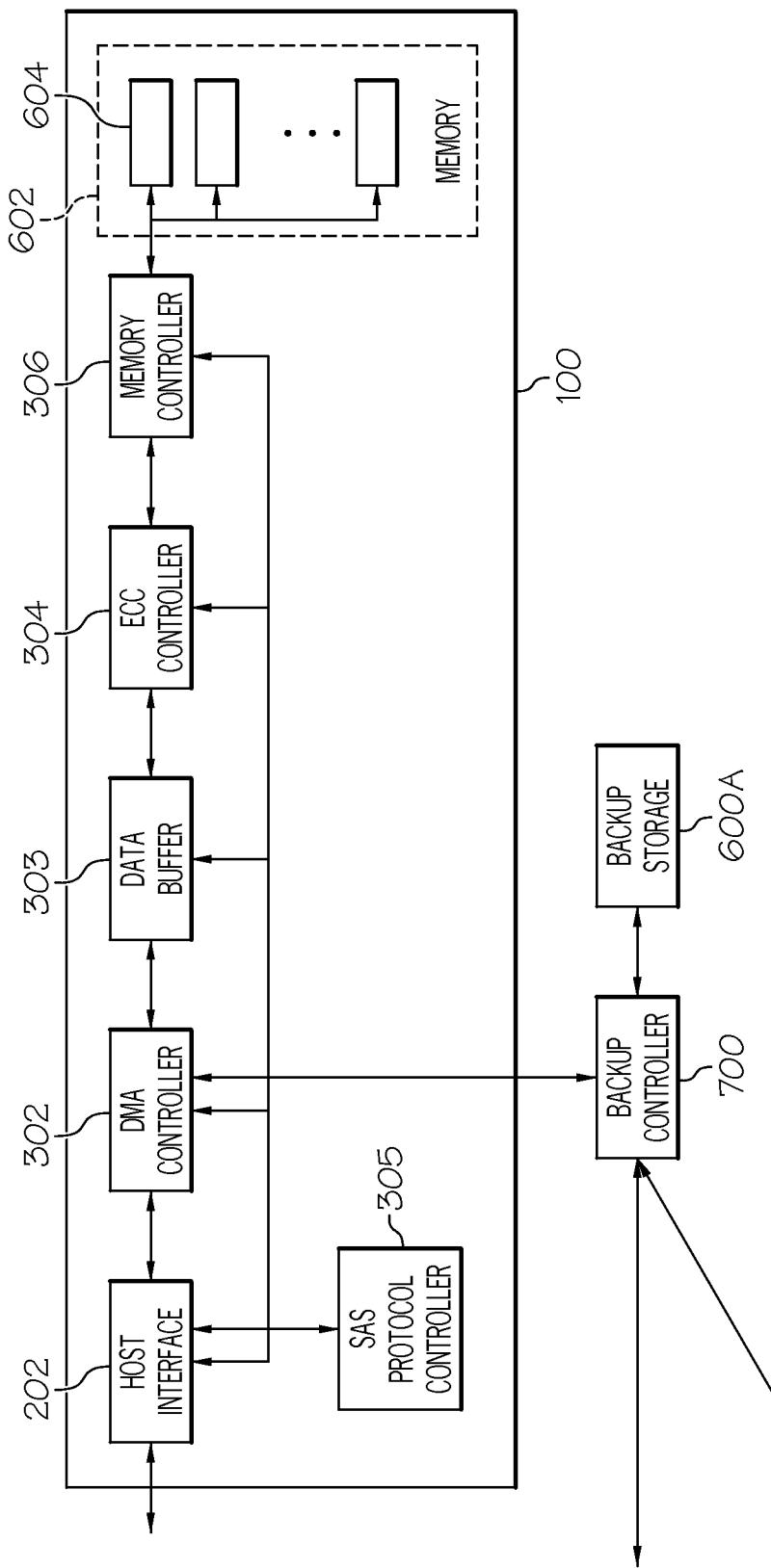
FIG. 2 is a diagram schematically illustrating a configuration of the high speed SSD of FIG. 1.

Referring now to FIG. 2, a diagram schematically illustrating a configuration of the high-speed SSD 100 is shown. As shown, SSD/memory disk unit 100 comprises: a host interface unit 202 (which can be interface 200 of FIG. 1); a SAS protocol controller 306 for controlling a SAS protocol of the SSD memory disk unit 100 coupled to host interface unit 202; a direct memory access (DMA) controller 302 for controlling access to the SSD memory disk unit 100 coupled to host interface unit 202; a data buffer 303 for buffering data stored in SSD memory disk unit 100 coupled to DMA controller 302; an error correcting code (ECC) controller 304 for correcting errors in SSD memory disk unit 100 coupled to data buffer 303; a memory controller 306 for controlling a memory module 604 having a set of memory block 604 of SSD memory disk unit 100, the memory controller being coupled to ECC controller 304. As further shown, a backup controller 700 can be coupled to DMA controller 302, and a backup storage unit 600A-BA can be coupled to backup controller 700.

In general, DMA is a feature of modern computers and microprocessors that allows certain hardware subsystems within the computer to access system memory for reading and/or writing independently of the central processing unit. Many hardware systems use DMA including disk drive controllers, graphics cards, network cards, and sound cards. DMA is also used for intra-chip data transfer in multi-core processors, especially in multiprocessor system-on-chips, where its processing element is equipped with a local memory (often called scratchpad memory) and DMA is used for transferring data between the local memory and the main memory. Computers that have DMA channels can transfer data to and from devices with much less CPU overhead than computers without a DMA channel. Similarly, a processing element inside a multi-core processor can transfer data to and from its local memory without occupying its processor time and allowing computation and data transfer concurrency.

Without DMA, using programmed input/output (PIO) mode for communication with peripheral devices, or load/store instructions in the case of multi-core chips, the CPU is typically fully occupied for the entire duration of the read or write operation, and is thus unavailable to perform other work. With DMA, the CPU would initiate the transfer, do other operations while the transfer is in progress, and receive an interrupt from the DMA controller once the operation has been done. This is especially useful in real-time computing applications where not stalling behind concurrent operations is critical.

In addition, FIG. 2 shows SAS protocol controller 305 for controlling a SAS protocol of SSD memory disk unit 100. In general, SAS is a computer bus used to move data to and from computer storage devices such as hard drives and tape drives. SAS depends on a point-to-point serial protocol that replaces the parallel SCSI bus technology that first appeared in the mid-1980s in data centers and workstations, and it uses the standard SCSI command set. SAS offers backwards-compatibility with second-generation SATA drives. SATA 3 Gbit/s drives may be connected to SAS backplanes, but SAS drives may not be connected to SATA backplanes. Additional details regarding SAS will be discussed in conjunction with FIG. 4.

Figure 3:
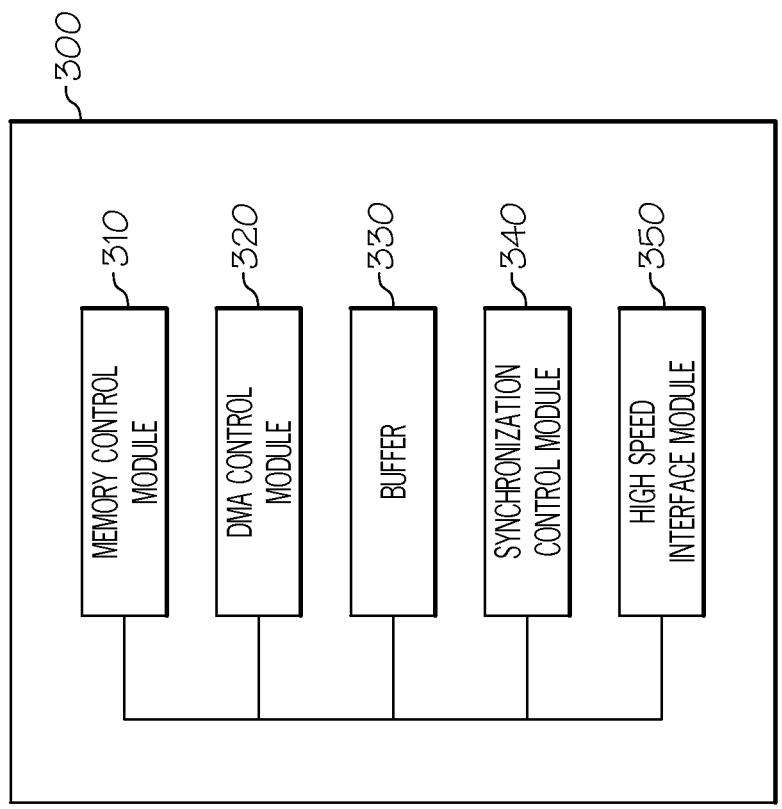
FIG. 3 is a diagram schematically illustrating a configuration of a controller unit in FIG. 1.

Referring first to FIG. 3, the controller unit 300 of FIG. 1 is shown as comprising: a memory control module 310 which controls data input/output of the memory disk unit 100; a DMA (Direct Memory Access) control module 320 which controls the memory control module 310 to store the data in the memory disk unit 100, or reads data from the memory disk unit 100 to provide the data to the host, according to an instruction from the host received through the PCI-Express host interface unit 200; a buffer 330 which buffers data according to the control of the DMA control module 320; a synchronization control module 340 which, when receiving a data signal corresponding to the data read from the memory disk unit 100 by the control of the DMA control module 320 through the DMA control module 320 and the memory control module 310, adjusts synchronization of a data signal so as to have a communication speed corresponding to a PCI-Express communications protocol to transmit the synchronized data signal to the PCI-Express host interface unit 200, and when receiving a data signal from the host through the PCI-Express host interface unit 200, adjusts synchronization of the data signal so as to have a transmission speed corresponding to a communications protocol (for example, PCI, PCI-x, or PCI-e, and the like) used by the memory disk unit 100 to transmit the synchronized data signal to the memory disk unit 100 through the DMA control module 320 and the memory control module 310; and a high-speed interface module 350 which processes the data transmitted/received between the synchronization control module 340 and the DMA control module 320 at high speed. Here, the high-speed interface module 350 includes a buffer having a double buffer structure and a buffer having a circular queue structure, and processes the data transmitted/received between the synchronization control module 340 and the DMA control module 320 without loss at high speed by buffering the data and adjusting data clocks.

As discussed above in conjunction with FIG. 2, an embodiment of the present invention utilizes (among other components) a SAS protocol controller and a data buffer. In general, the T10 technical committee of the International Committee for Information Technology Standards (INCITS) develops and maintains the SAS protocol and the SCSI Trade Association (SCSITA) promotes the technology.

A typical Serial-attached SCSI system consists of the following basic components:

1. An Initiator: a device that originates device-service and task-management requests for processing by a target device and receives responses for the same requests from other target devices. An initiator may be provided as an on-board component on the motherboard (as is the case with many server-oriented motherboards) or as an add-on host bus adapter.

2. A Target: a device containing logical units and target ports that receives device service and task management requests for processing and sends responses for the same requests to initiator devices. A target device could be a hard disk or a disk array system.

3. A Service Delivery Subsystem: the part of an I/O system that transmits information between an initiator and a target. Typically, cables connecting an initiator and a target with or without expanders and backplanes constitute a service delivery subsystem. 4. Expanders: devices that form part of a service delivery subsystem and facilitate communication between SAS devices. Expanders facilitate the connection of multiple SAS end devices to a single initiator port.

Figure 4:
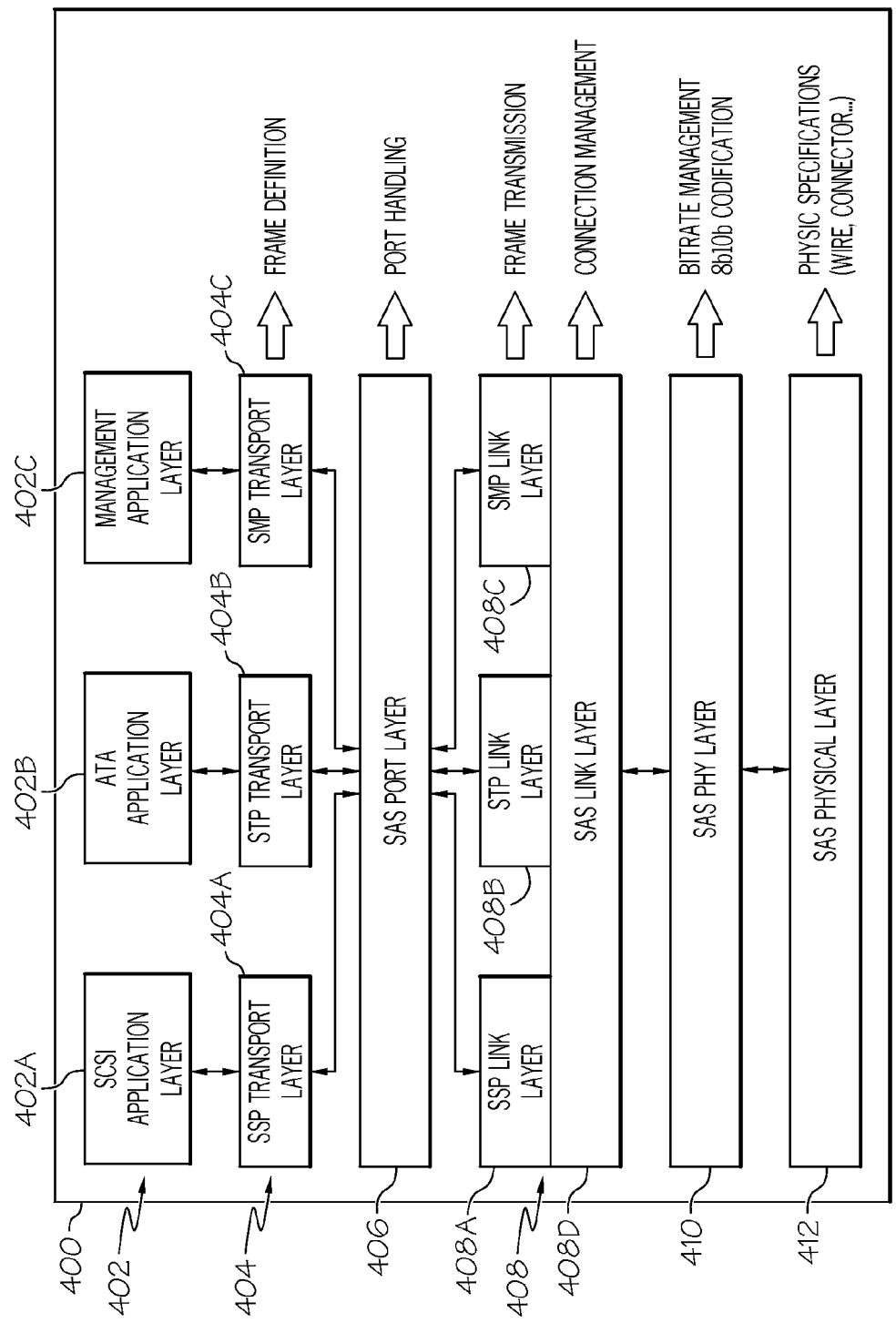
FIG. 4 is a diagram schematically illustrating an SAS architecture according to an embodiment of the present invention.

Referring now to FIG. 4, a SAS architectural diagram according to an embodiment of the present invention is shown. Specifically, the SAS architectural diagram of FIG. 4 shows the following layers (in order from highest to lowest):

Application layer 400 having SCSI application layer 402A, ATA application layer 402B, and management application layer 402C.

Transport layer 404 having Serial SCSI Protocol (SSP) transport layer 404A, Serial ATA Tunneling Protocol (STP) transport layer 404B, and Serial Management Protocol (SMP) Transport Layer 404C.

SAS Port layer 406.

SAS Link layer 408 having SSP link layer 408A, STP link layer 408B, and SMP link layer 408C.

SAS PHY layer 410.

SAS Physical layer 412.

In general, SAS technology comprises three transport protocols:

SSP—supporting SAS disk drives.
STP—supporting SATA disks.
SMP—for managing SAS Expanders.

For Link layer 408 and PHY layer 410, SAS defines its own unique protocol. At the physical layer 412, the SAS standard defines connectors and voltage levels. The physical characteristics of the SAS wiring and signaling are compatible with and have loosely tracked that of SATA up to the present 6 Gbit/s rate, although SAS defines more rigorous physical signaling specifications as well as a wider allowable differential voltage swing intended to support longer cabling. While SAS-1.0/SAS-1.1 adopted the physical signaling characteristics of SATA at the 1.5 Gbit/s and 3 Gbit/s rates, SAS-2.0 development of a 6 Gbit/s physical rate led to the development of an equivalent SATA speed. According to the SCSI Trade Association, 12 Gbit/s is slated to follow 6 Gbit/s in a future SAS-3.0 specification. The various layers shown in FIG. 4 have the following features:

Physical layer 412:
  Defines electrical and physical characteristics
  Differential signaling transmission
  Three connector types:
    SFF 8482—SATA compatible
    SFF 8484—up to four devices
    SFF 8470—external connector (InfiniBand connector), up to four devices PHY Layer 410:
  8b/10b data encoding
  Link initialization, speed negotiation, and reset sequences
  Link capabilities negotiation (SAS-2)

Link layer 408:
  Insertion and deletion of primitives for clock-speed disparity matching
  Primitive encoding
  Data scrambling for reduced EMI
  Establish and tear down native connections between SAS targets and initiators
  Establish and tear down tunneled connections between SAS initiators and SATA targets connected to SAS expanders
  Power management (proposed for SAS-2.1)

Port layer 406:
  Combining multiple PHYs with the same addresses into wide ports Transport layer 404:
  Supports three transport protocols:
    Serial SCSI Protocol (SSP): supports SAS devices
    Serial ATA Tunneled Protocol (STP): supports SATA devices attached to SAS expanders
    Serial Management Protocol (SMP): provides for the configuration of SAS expanders Application layer 402

An initiator may connect directly to a target via one or more PHYs (such a connection is called a port whether or not it uses one or more PHYs, although the term wide port is sometimes used for a multi-PHY connection). The components known as Serial-attached SCSI Expanders (SAS Expanders) facilitate communication between large numbers of SAS devices. Expanders contain two or more external expander-ports. Each expander device contains at least one SAS Management Protocol target port for management and may contain SAS devices itself. For example, an expander may include a Serial SCSI Protocol target port for access to a peripheral device. An expander is not necessary to interface a SAS initiator and target, but allows a single initiator to communicate with more SAS/SATA targets. A useful analogy: one can regard an expander as akin to a network switch in a network which allows multiple systems to be connected using a single switch port.

SAS 1 defines two different types of expanders; however, the SAS-2.0 standard has dropped the distinction between the two, as it created unnecessary topological limitations with no realized benefit:

An edge expander allows for communication with up to 255 SAS addresses, allowing the SAS initiator to communicate with these additional devices. Edge expanders can do direct table routing and subtractive routing. (For a brief discussion of these routing mechanisms, see below.) Without a fanout expander, you can use at most two edge expanders in your delivery subsystem (because you will connect the subtractive routing port of those edge expanders together, and you cannot connect any more expanders). To solve this bottleneck, you would use fanout expanders.

A fanout expander can connect up to 255 sets of edge expanders, known as an edge expander device set, allowing for even more SAS devices to be addressed. The subtractive routing port of each edge expanders will be connected to the PHYs of the fanout expander. A fanout expander cannot do subtractive routing. It can only forward subtractive routing requests to the connected edge expanders.

Direct routing allows a device to identify devices directly connected to it. Table routing identifies devices connected to the expanders connected to a device's own PHY. Subtractive routing is used when you are not able to find the devices in the sub-branch you belong to. This will pass the request to a different branch altogether.

Expanders exist to allow more complex interconnect topologies. Expanders assist in link-switching (as opposed to packet-switching) end-devices (initiators or targets). They may locate an end-device either directly (when the end-device is connected to it), via a routing table (a mapping of end-device IDs and the expander the link should be switched to downstream to route towards that ID), or, when those methods fail, via subtractive routing wherein the link is routed to a single expander connected to a subtractive routing port. If there is no expander connected to a subtractive port, the end-device cannot be reached.

Expanders with no PHYs configured as subtractive act as fanout expanders and can connect to any number of other expanders. Expanders with subtractive PHYs may only connect to two other expanders at a maximum, and, in that case, they must connect to one expander via a subtractive port and the other via a non-subtractive port.

SAS-1.1 topologies built with expanders will generally contain one root node in a SAS domain with the one exception being topologies that contain two expanders connected via a subtractive-to-subtractive port. If it exists, the root node is the expander which is not connected to another expander via a subtractive port. Therefore, if a fanout expander exists in the configuration, it must be the domain's root node. The root node contains routes for all end devices connected to the domain. Note that with the advent of SAS-2.0 of table-to-table routing and new rules for end-to-end zoning, more complex topologies built upon SAS-2.0 rules will not contain a single root node.

Referring back to FIG. 1, auxiliary power source unit 400 may be configured as a rechargeable battery or the like, so that it is normally charged to maintain a predetermined power using power transferred from the host through the PCI-Express host interface unit 200 and supplies the charged power to the power source control unit 500 according to the control of the power source control unit 500.

The power source control unit 500 supplies the power transferred from the host through the PCI-Express host interface unit 200 to the controller unit 300, the memory disk unit 100, the backup storage unit 600A-B, and the backup control unit 700.

In addition, when an error occurs in a power source of the host because the power transmitted from the host through the PCI-Express host interface unit 200 is blocked, or the power transmitted from the host deviates from a threshold value, the power source control unit 500 receives power from the auxiliary power source unit 400 and supplies the power to the memory disk unit 100 through the controller unit 300.

The backup storage unit 600A-B is configured as a low-speed non-volatile storage device such as a hard disk and stores data of the memory disk unit 100.

The backup control unit 700 backs up data stored in the memory disk unit 100 in the backup storage unit 600A-B by controlling the data input/output of the backup storage unit 600A-B and backs up the data stored in the memory disk unit 100 in the backup storage unit 600A-B according to an instruction from the host, or when an error occurs in the power source of the host due to a deviation of the power transmitted from the host deviates from the threshold value.

The storage device of a serial-attached small computer system interface/serial advanced technology attachment (PCI-Express) type supports a low-speed data processing speed for a host by adjusting synchronization of a data signal transmitted/received between the host and a memory disk during data communications between the host and the memory disk through a PCI-Express interface, and simultaneously supports a high-speed data processing speed for the memory disk, thereby supporting the performance of the memory to enable high-speed data processing in an existing interface environment at the maximum.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A semiconductor storage device (SSD) memory disk unit, comprising:
    a host interface unit;
    a serial-attached small computer system interface (SAS) protocol controller for controlling a SAS protocol of the SSD memory disk unit coupled to the host interface unit;
    a direct memory access (DMA) controller for controlling access to the SSD memory disk unit coupled to the host interface unit;
    a data buffer for buffering data stored in the SSD memory disk unit coupled to the DMA controller; and
    a backup controller coupled to the DMA controller.

2. The SSD memory disk unit of claim 1, further comprising an error correcting code (ECC) controller for correcting errors in the SSD memory disk unit coupled to the data buffer.

3. The SSD memory disk unit of claim 2, further comprising a memory controller for controlling a memory module of the SSD memory disk unit, the memory controller being coupled to the ECC controller.

4. The SSD memory disk unit of claim 3, the memory module comprising a set of memory blocks.

5. The SSD memory disk unit of claim 1, further comprising a backup storage unit coupled to the backup controller.

6. The SSD memory disk unit of claim 1, further comprising a redundant array of independent disks (RAID) controller coupled to the SSD memory disk unit.

7. The SSD memory disk unit of claim 6, further comprising a controller unit coupled to the RAID controller.

8. A semiconductor storage device (SSD) memory system, comprising:
    a set of SSD memory disk units, each of the set of SSD memory disk units comprising:
        a host interface unit;
        a serial-attached small computer system interface (SAS) protocol controller coupled to the host interface unit for controlling a SAS protocol of the SSD memory disk unit;
        a direct memory access (DMA) controller coupled to the host interface unit for controlling access to the SSD memory disk unit;
        a data buffer for buffering data stored in the SSD memory disk unit coupled to the DMA controller;
        a redundant array of independent disks (RAID) controller coupled to the set of SSD memory disk units;
        a controller unit coupled to the RAID controller; and
        a backup controller coupled to the DMA controller.

9. The SSD memory disk system of claim 8, the set of SSD memory disk units each further comprising an error correcting code (ECC) controller for correcting errors in the SSD memory disk unit coupled to the data buffer.

10. The SSD memory disk system of claim 9, the set of SSD memory disk units each further comprising a memory controller for controlling a memory module of the SSD memory disk unit, the memory controller being coupled to the ECC controller.

11. The SSD memory disk system of claim 10, the memory module comprising a set of memory blocks.

12. The SSD memory disk system of claim 8, further comprising a backup storage unit coupled to the backup controller.

13. A method for producing a semiconductor storage device (SSD) memory disk unit, comprising:
    providing a host interface unit;
    coupling a serial-attached small computer system interface (SAS) protocol controller to the host interface unit, the SAS protocol controller being configured to control a SAS protocol of the SSD memory disk unit;
coupling a direct memory access (DMA) to the host interface unit, the DMA controller being configured to control access to the SSD memory disk unit;
coupling a data buffer to the DMA controller, the data buffer being configured to buffer data stored in the SSD memory disk unit; and
coupling a backup controller to the DMA controller.

14. The method of claim 13, further comprising coupling an error correcting code (ECC) controller to the data buffer, the ECC controller correcting errors in the SSD memory disk unit.

15. The method of claim 14, further comprising coupling a memory controller to the ECC controller, the memory controller being configured to control a memory module of the SSD memory disk unit.

16. The memory of claim 15, the memory module comprising a set of memory blocks.

17. The method of claim 13, further comprising coupling a backup storage unit to the backup controller.

* * * * *